United States Patent
Huang (10) Patent No.: US 11,144,732 B2
(45) Date of Patent: Oct. 12, 2021

(54) APPARATUS AND METHOD FOR USER-CUSTOMIZED INTERPRETATION AND TRANSLATION

(71) Applicant: Electronics and Telecommunications Research Institute, Daejeon (KR)

(72) Inventor: Jinxia Huang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 280 days.

(21) Appl. No.: 16/158,784

(22) Filed: Oct. 12, 2018

(65) Prior Publication Data

US 2019/0114322 A1 Apr. 18, 2019

(30) Foreign Application Priority Data

Oct. 12, 2017 (KR) ........................ 10-2017-0132242

(51) Int. Cl.
| | |
|---|---|
| *G06F 40/40* | (2020.01) |
| *G06F 16/31* | (2019.01) |
| *G06F 40/58* | (2020.01) |
| *G06F 40/205* | (2020.01) |
| *G06F 40/242* | (2020.01) |
| *G06F 40/263* | (2020.01) |
| *G06F 40/268* | (2020.01) |
| *G10L 15/26* | (2006.01) |

(52) U.S. Cl.
CPC ............ *G06F 40/40* (2020.01); *G06F 16/313* (2019.01); *G06F 40/205* (2020.01); *G06F 40/242* (2020.01); *G06F 40/263* (2020.01); *G06F 40/268* (2020.01); *G06F 40/58* (2020.01); *G10L 15/26* (2013.01)

(58) Field of Classification Search
None
See application file for complete search history.

(56) References Cited

U.S. PATENT DOCUMENTS 5,329,446 A * 7/1994 Kugimiya ............... G06F 40/55
704/4
5,646,840 A * 7/1997 Yamauchi ............... G06F 40/55
704/2

(Continued)

FOREIGN PATENT DOCUMENTS

| KR | 10-2013-0135676 | 12/2013 |
| KR | 10-2014-0079543 | 6/2014 |

*Primary Examiner* — Neeraj Sharma
(74) *Attorney, Agent, or Firm* — Kile Park Reed & Houtteman PLLC (57) ABSTRACT

Disclosed are an apparatus and method for user-customized interpretation and translation, in which the user-customized interpretation and translation apparatus including an original text receiver configured to convert an input original into a text; a configuration manager configured to receive and provide user-settings information; a translation object preprocessor configured to perform a preprocessing function on the input original text according to the user-settings information when the original text is received from the original text receiver; and an automatic translator configured to translate the original text and make an output according to set translation types.

12 Claims, 9 Drawing Sheets

(56) References Cited

U.S. PATENT DOCUMENTS

| | | | |
|---|---|---|---|
| 2007/0203688 A1* | 8/2007 | Fuji | G06F 40/40 |
| | | | 704/2 |
| 2007/0269775 A1* | 11/2007 | Andreev | G09B 7/00 |
| | | | 434/156 |
| 2009/0248392 A1* | 10/2009 | Talwar | H04L 51/063 |
| | | | 704/3 |
| 2011/0153309 A1 | 6/2011 | Kim et al. | |
| 2011/0301936 A1 | 12/2011 | Yun et al. | |
| 2011/0307241 A1* | 12/2011 | Waibel | G10L 15/06 |
| | | | 704/2 |
| 2012/0197629 A1 | 8/2012 | Nakamura et al. | |
| 2012/0316860 A1 | 12/2012 | Reitan | |
| 2013/0197898 A1* | 8/2013 | Choi | G06F 40/40 |
| | | | 704/3 |
| 2014/0229157 A1* | 8/2014 | Leydon | G06F 40/51 |
| | | | 704/2 |
| 2014/0303960 A1* | 10/2014 | Orsini | H04L 51/04 |
| | | | 704/2 |
| 2014/0342338 A1* | 11/2014 | Imran | A61B 5/4812 |
| | | | 434/319 |
| 2014/0358518 A1* | 12/2014 | Wu | G06F 40/58 |
| | | | 704/3 |
| 2016/0259971 A1* | 9/2016 | Kim | G06K 9/4633 |
| 2017/0091179 A1* | 3/2017 | Kim | G06F 40/58 |
| 2017/0220681 A1* | 8/2017 | Daas | G06F 40/186 |
| 2018/0061274 A1* | 3/2018 | Frahling | G06F 40/169 |
| 2018/0158365 A1* | 6/2018 | Roche | G09B 17/003 |

* cited by examiner

APPARATUS AND METHOD FOR USER-CUSTOMIZED INTERPRETATION AND TRANSLATION

CROSS-REFERENCE TO RELATED APPLICATION

This application claims priority to and the benefit of Korean Patent Application No. 2017-0132242, filed on Oct. 12, 2017, the disclosure of which is incorporated herein by reference in its entirety.

BACKGROUND

1. Field of the Invention

The present invention relates to an apparatus and method for user-customized interpretation and translation, and more specifically, to an apparatus and method for user-customized interpretation and translation, in which a speaker's speech is subjected to voice recognition and automatic translation, thereby providing various types of interpretation and translation services in response to a user's foreign language level or request.

2. Discussion of Related Art

A general interpretation and translation service provides a full text interpretation or full text voice recognition result for all voices regardless of a user's foreign language level.

Such a conventional interpretation and translation service has been applied as an automatic interpretation and translation apparatus for interpreting and translating a source language into a target language like Korean Patent Application No. 10-2014-0079543 (titled 'Auto Interpreting and Translation Apparatus')

However, the conventional interpretation and translation apparatus does not produce a target language as a translation result until after a sentence or speech input is finished, and thus has various problems when the conventional interpretation and translation apparatus performs interpretation and translation like real-time interpretation for a lecture.

Meanwhile, a real-time automatic interpretation and translation service broadly has a voice recognition function and an automatic translation function, and the automatic translation unavoidably includes more errors than the voice recognition because the translation is performed on a script that contains an error of the voice recognition.

Further, as compared with the conventional interpretation and translation, real-time automatic interpretation and translation increases such an error since the voice recognition and the translation have to be performed on partial sentences, and, in a particular case of a lecture on a specialized subject, decreases accuracy in interpretation and translation because an uttered sentence is long and many sentences are uttered consecutively without boundaries.

In addition, the conventional automatic interpretation and translation service provides the same automatic interpretation or automatic translation results regardless of a foreign language level of a user who uses the service, and therefore, it may be inconvenient for a user to understand the automatic translation results in accordance with his/her foreign language level.

For example, when a user has excellent reading comprehension skills but relatively low listening skills in a foreign language, it may be more effective to provide a subtitle based on a voice recognition result of the foreign language rather than an automatic interpretation result including an error. On the other hand, when a user has a high level of listening skill but a relatively small vocabulary, his/her comprehension of the automatic translation may be enhanced by translating only high level key words.

Besides, when a user has a low degree of comprehension of a foreign language, full speech interpretation and translation are required even including errors.

SUMMARY OF THE INVENTION

The present invention is conceived to solve the above problems, and directed to providing an apparatus and method for user-customized interpretation and translation, in which a differentiated interpretation and translation service is provided according to foreign language comprehension levels of users who use the automatic interpretation and translation service.

Aspects of the present invention are not limited to the objects mentioned above, and other unmentioned aspects will be clearly understood by a person having an ordinary skill in the art from the following descriptions.

According to one embodiment of the present invention, there is provided a user-customized interpretation and translation apparatus including: an original text receiver configured to receive an original text; a configuration manager configured to receive user-settings information; a translation object preprocessor configured to perform a preprocessing function for determining a translation type of the original text according to the user-settings information; and an automatic translator configured to translate and output the preprocessed original text.

According to one embodiment of the present invention, there is provided a user-customized interpretation and translation method including: receiving an original text through an original text receiver; receiving user-settings information through a configuration manager; by a translation object preprocessor, performing a preprocessing function on the original text to determine a translation type of the original text according to the received user-settings information when the original text is received; and by an automatic translator, translating and outputting the preprocessed original text.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The merits and features of the present invention, and methods of materializing them will become apparent with reference to embodiments set forth herein and the accompanying drawings. However, the present invention is not limited to the exemplary embodiments disclosed below, but may be implemented in various forms. The following exemplary embodiments are described in order to fully disclose the present invention and enable those of ordinary skill in the art to embody and practice the invention, and the scope of which is defined in the appended claims. Meanwhile, terms used herein are merely to describe the embodiments, and are not construed as limiting the present invention. In this disclosure, the singular forms are intended to include the plural forms as well, unless the context clearly indicates otherwise. The terms "includes (comprises)" and/or "including (comprising)" used herein specify the presence of stated elements, steps, operations, and/or devices, but do not preclude the presence or addition of one or more other elements, steps, operations, and/or devices.

Hereinafter, exemplary embodiments of the present invention will be described in detail with reference to the accompanying drawings.

Figure 1:
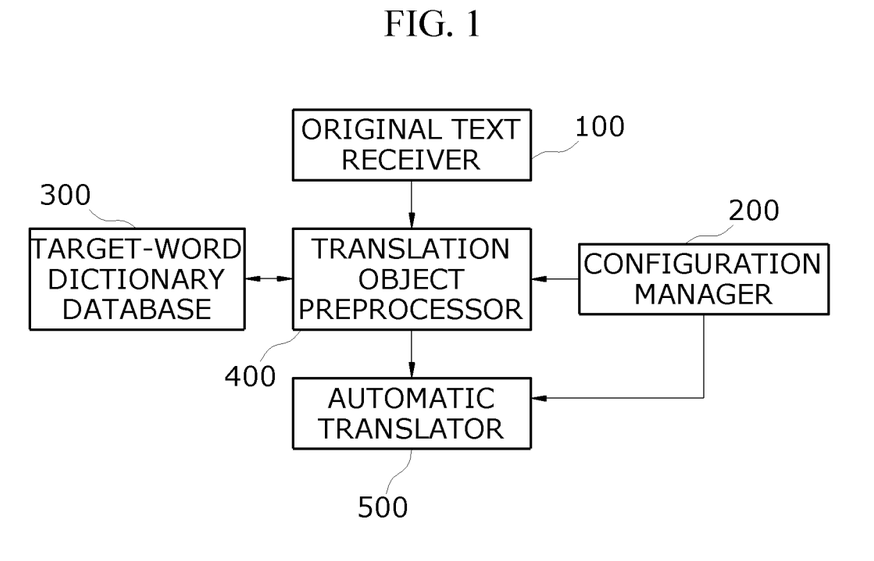
FIG. 1 is a functional block diagram for describing a user-customized interpretation and translation apparatus according to one embodiment of the present invention.

FIG. 1 is a functional block diagram for describing a user-customized interpretation and translation apparatus according to one embodiment of the present invention. As shown in FIG. 1, the user-customized interpretation and translation apparatus according to one embodiment of the present invention includes an original text receiver 100, a configuration manager 200, a target-word dictionary database 300, a translation object preprocessor 400, and an automatic translator 500.

The original text receiver 100 serves to convert an input original into a text. Here, the original text receiver 100 according to one embodiment of the present invention includes a voice recognizer 110 and a text converter 120. Here, the voice recognizer 110 serves to recognize a voice which is input in real time. For example, the voice recognizer 110 may include a microphone, and the text converter 120 serves to convert a voice recognized by the voice recognizer 110 into a text.

Further, the configuration manager 200 receives user-settings information, and provides the received user-settings information to the translation object preprocessor 400 and the automatic translator 500. The configuration manager 200 may include a user input interface such as a character input part so that a user can input information. Here, the user-settings information may be information about a user's foreign language skill level, i.e., a user language level. In this case, information about a user's foreign language skill level may be set based on a test of translation language skills.

Figure 2:
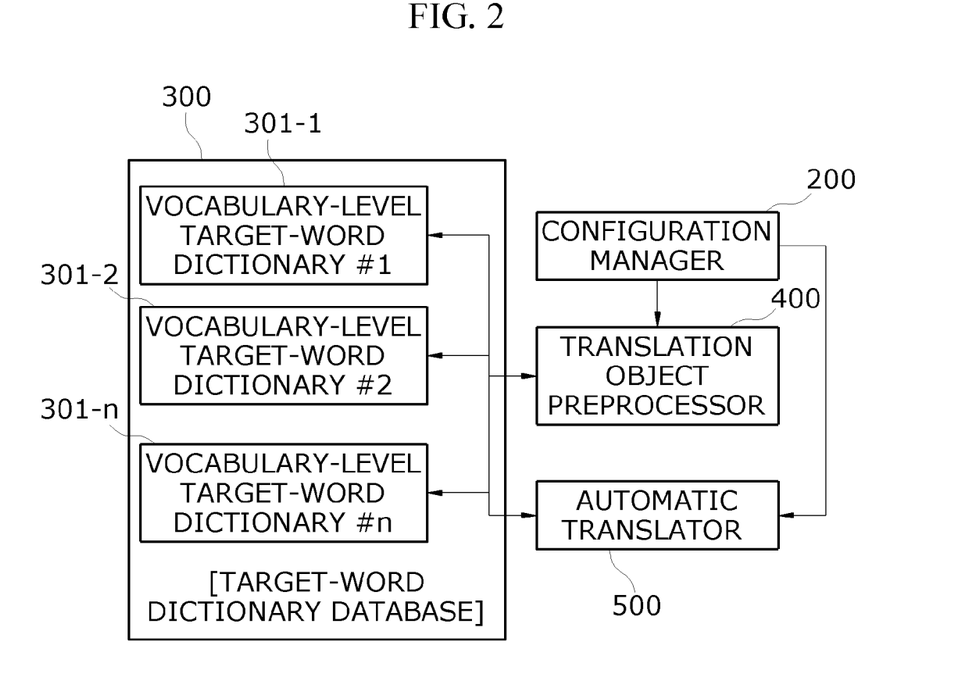
FIG. 2 is a view for describing a configuration of a target-word dictionary database in a user-customized interpretation and translation apparatus according to one embodiment of the present invention.

Like this, when the user-settings information includes the information about a user's foreign language skill level, it is advantageous for the automatic translator 500 to provide a user-customized translation service by referring to a vocabulary-level target-word dictionary 301, of which words correspond to the user's foreign language skill level, from the target-word dictionary database 300.

Meanwhile, the target-word dictionary database 300 is configured to store vocabulary information about a language matched with the foreign language skill level. As shown in FIG. 2, the target-word dictionary database 300 includes vocabulary-level target-word dictionaries 301-1 to 301-$n$ corresponding to a user's foreign language skill level.

Further, the translation object preprocessor 400 serves to perform a preprocessing function for determining a translation type of an original text input according to the user-settings information provided from the configuration manager 200 when the original text is input from the original text receiver 100.

Further, the automatic translator 500 serves to translate the preprocessed original text according to the user-settings information provided by the configuration manager 200, and to output a translation according to user translation type information set by the configuration manager.

Like this, according to one embodiment of the present invention, translation of an original text is customized according to the user-settings information, i.e., the user language level in automatic interpretation and translation, thereby having an effect on enhancing comprehension of lecture/lesson/moving pictures/conversation content in foreign language.

Thus, one embodiment of the present invention may be used in interpretation and translation services such as a real-time interpretation and translation service in an actual lecture environment such as a lecture room, etc., an interpretation and translation service of an online/offline moving pictures, an interpretation and translation service of a voice conversation or a translation service of a text conversation between online game players, an interpretation and translation service and interpretation service using a conversation/messenger application, an interpretation and translation service using a translation application, etc.

Here, the user-settings information employed in one embodiment of the present invention may include translation type information corresponding to information about the user language level.

Thus, when the user-settings information includes the translation type information, it is advantageous for a user to not only receive a translation service customized according to his/her own foreign language skill level but also have a high degree of translation comprehension with the output of the translation type which is easy for the user to understand.

Meanwhile, the translation type information of the user-settings information may automatically match the translation type information corresponding to the information about the user language level or may be directly set up by a user.

Here, the translation type information employed according to one embodiment of the present invention may include foreign language voice recognition original text subtitle information with an added sentence boundary, foreign language key-word translation information, and sentence translation information.

Meanwhile, the sentence translation information may include one of key word and target word information, phrase unit real-time translation information, and sentence unit translation information.

Such sentence translation information may include one of the key word and the target word information, the phrase unit real-time translation information to reduce a translation delay in the real-time interpretation and translation, and sentence unit translation information when a user has no idea of a corresponding foreign language or when a corresponding subject translation performance is high.

Figure 3:
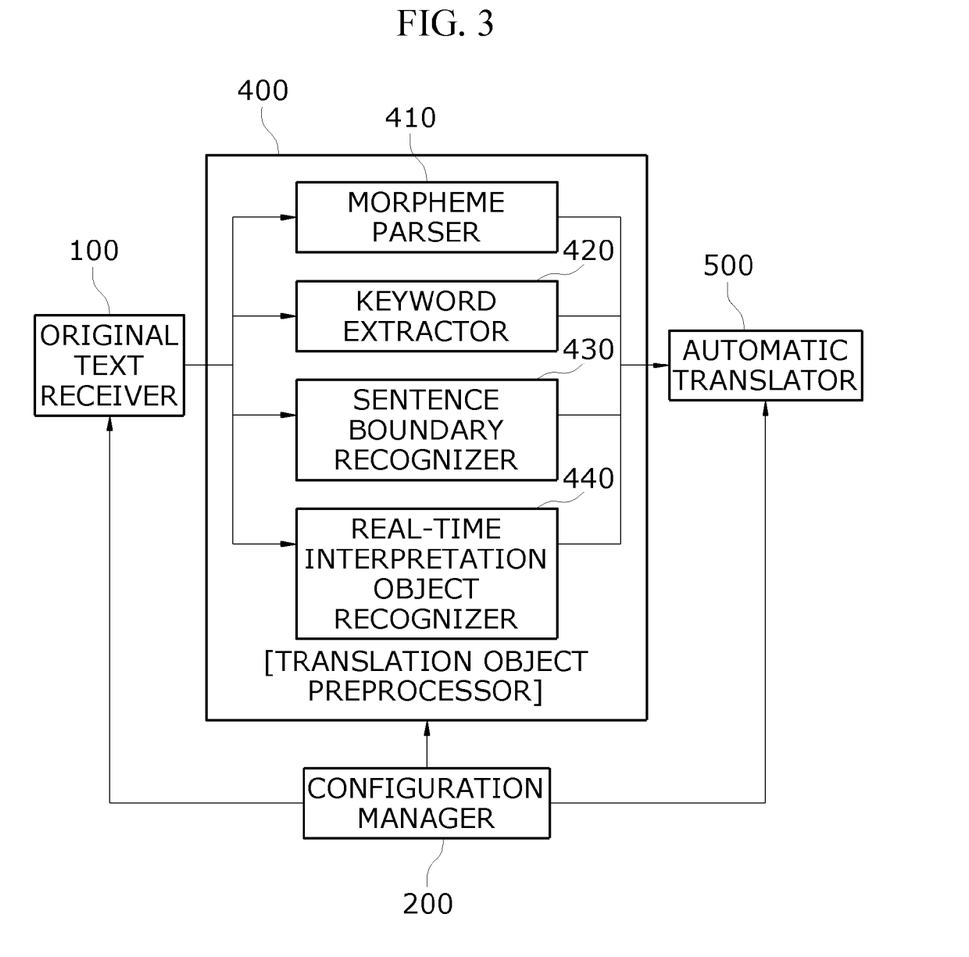
FIG. 3 is a view for describing details of a translation object preprocessor in a user-customized interpretation and translation apparatus according to one embodiment of the present invention.

FIG. 3 is a view for describing details of a translation object preprocessor in a user-customized interpretation and translation apparatus according to one embodiment of the present invention.

As shown in FIG. 3, the translation object preprocessor 400 employed in one embodiment of the present invention includes a morpheme parser 410, a keyword extractor 420, a sentence boundary recognizer 430, and a real-time interpretation object recognizer 440.

The morpheme parser 410 serves to analyze morphemes of an original and parts of speech according to the user-settings information.

Further, the keyword extractor 420 serves to use a vocabulary appearance frequency, term frequency (TF)/inverse document frequency (IDF) calculation of vocabulary appearance, and vocabulary level information to extract a related keyword in keyword or foreign word translation.

The sentence boundary recognizer 430 serves to divide an input text into sentence units.

Further, the real-time interpretation object recognizer 440 serves to divide an input text at certain positions of a continuous voice input when short sentence translation is set, so as to minimize the translation delay.

The real-time interpretation object recognizer 440 makes the original text be distinguishably tagged with context information, which is not the translation object but be referenceable while selecting a translation and target word, and uses a method of selecting and translating the original text according to the user language level information, thereby performing the customized translation.

Like this, the translation object preprocessor 400 uses one of the morpheme parser 410, the keyword extractor 420, the sentence boundary recognizer 430, and real-time interpretation object recognizer 440 to preprocess the input original text according to the user-settings information provided from the configuration manager 200.

Figure 4:
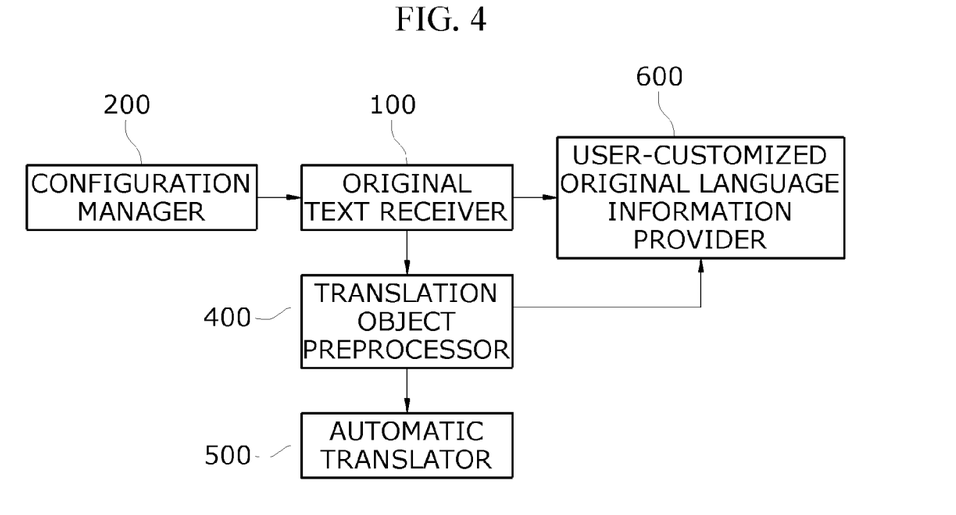
FIG. 4 is a functional block diagram for describing a user-customized interpretation and translation apparatus according to another embodiment of the present invention.

FIG. 4 is a functional block diagram for describing a user-customized interpretation and translation apparatus according to another embodiment of the present invention.

As shown in FIG. 4, the user-customized interpretation and translation apparatus according to another embodiment of the present invention further includes a user-customized original language information provider 600 in addition to that according to the foregoing embodiment of the present invention. In this embodiment, repetitive descriptions of the components of the foregoing embodiment will be omitted.

The user-customized original language information provider 600 serves to process and output an input text into an original text, when a text converted from a voice is received from the text converter 120 and the original text subtitle information function is set by the configuration manager 200.

Below, a procedure of interpreting or translating a text, which is input as a voice to the user-customized interpretation and translation apparatus, will be described according to one embodiment of the present invention.

First, when the original text receiver 100 receives a speech such as "virtual reality is an incredible new tool that gives people a different perspective it offers the feeling of full immersion within our news stories and reports and . . . " and converts the voice into a text.

Further, the configuration manager 200 receives user-settings information from a user. In this case, the user-settings information may include a user's foreign language skill level information, i.e., user language level information. Here, the user language level information may be set by a test for a translation language skill or may be directly set by a user.

Like this, when user language level information is included in the user-settings information, translation based on the target word of the translation text is achieved according to the language level information.

To this end, the original text receiver 100 provides the original input text to the translation object preprocessor 400.

Then, the translation object preprocessor 400 parses the original text into morphemes, parts of speech, etc. and references a target-word dictionary matching with the vocabulary level stored in the target-word dictionary database, thereby selectively transmitting a partial or full original text corresponding to the user-settings information to the automatic translator 500.

Then, the automatic translator 500 receives the original text (or original language text) with information related to a translation object, and references the target-word dictionary database 300, thereby performing the customized translation. In this case, the automatic translator 500 may employ various existing rule-based, statistics-based, or deep-learning-based translation methods.

For example, when the user language level information shows that a user has no idea of a corresponding foreign language or a corresponding subject translation performance is high, the automatic translator 500 references a vocabulary dictionary matching with an absolute beginner level of the corresponding foreign language from the target-word dictionary database 300, and outputs a translation of "가상 현실은 사람들에게 다른 관점을 제공하는 놀라운 새로운 도구이다. 이는 우리 뉴스 기사 및 보고서에 완전한 몰입감을 제공한다."

Therefore, a user who has no idea of the corresponding foreign language can receive the very best translation service.

According to another embodiment of the present invention, the translation type information may be involved according to the user language level information in the user-settings information. When the user-settings information set by a user involves the translation type information, the automatic translator 500 outputs a translation corresponding to the translation type information.

When the translation type information of the user-settings information set by a user is the phrase unit real-time translation information for reducing the translation delay in the real-time interpretation and translation, the automatic translator 500 outputs a translation such as "virtual reality is an incredible new tool 가상 현실은 놀라운 새로운 도구다 //that gives people a different perspective 사람들에게 다른 시각을 제공한다//it offers the feeling of full immersion 이는 완전한 몰입감을 준다 //within our news stories and reports . . . 우리의 뉴스기사 및 보고서 . . . " based on a translation type.

On the other hand, when the translation type information of the user-settings information set by a user is the foreign language voice recognition script information with the added sentence boundary, the original text receiver 100 provides the converted original text not to the translation object preprocessor 400 but to the user-customized original language information provider 600. In this case, the original text receiver 100 may provide the original text to the translation object preprocessor 400 without translating the original text.

Then, the user-customized original language information provider 600 may output the original text of "virtual reality is an incredible new tool that gives people a different perspective it offers the feeling of full immersion within our news stories and reports and . . . ".

Like this, according to the user-settings information, a user who has a native-speaking level as the foreign language level may prefer the original to the translation, and thus be provided with the original rather than the translation of the original.

On the other hand, when the translation type information from the user configuration manager is foreign language key word information, the original text receiver 100 provides the original text to the translation object preprocessor 400.

In this case, a user's foreign language level is so high that selective provision of only key words which are difficult to understand is enough to aid him/her in understanding the original without full translation of the original.

Thus, the translation object preprocessor 400 outputs a final result of "virtual reality/full immersion/ . . . " In this case, a method of selecting key words according to one embodiment of the present invention may employ information about vocabulary appearance frequency, TF/IDF calculation of vocabulary appearance, a vocabulary level, and the like to extract the key words.

Meanwhile, when the translation type information from the user configuration manager is the key word and target word information, the original text receiver 100 provides the original text to the translation object preprocessor 400.

For example, the translation object preprocessor 400 recognizes "virtual reality/full immersion/ . . . " as the key words, and outputs the recognized key words to the automatic translator 500, and the automatic translator outputs a translation of "virtual reality (가상 현실)/full immersion (완전한 몰입감)/ . . . " or outputs a translation in the format like "virtual reality (가상 현실) is an incredible new tool that gives people a different perspective it offers the feeling of full immersion (완전한 몰입감) within our news stories and reports and . . . ."

As described above, a user can understand the original in real time with the translation of only some key words rather than the full translation of the original.

In the foregoing embodiments, the translation type information is automatically set corresponding to the user-settings information, but the present invention is not limited thereto. Alternatively, a user may directly set the translation type information in the user-settings information.

Figure 5:
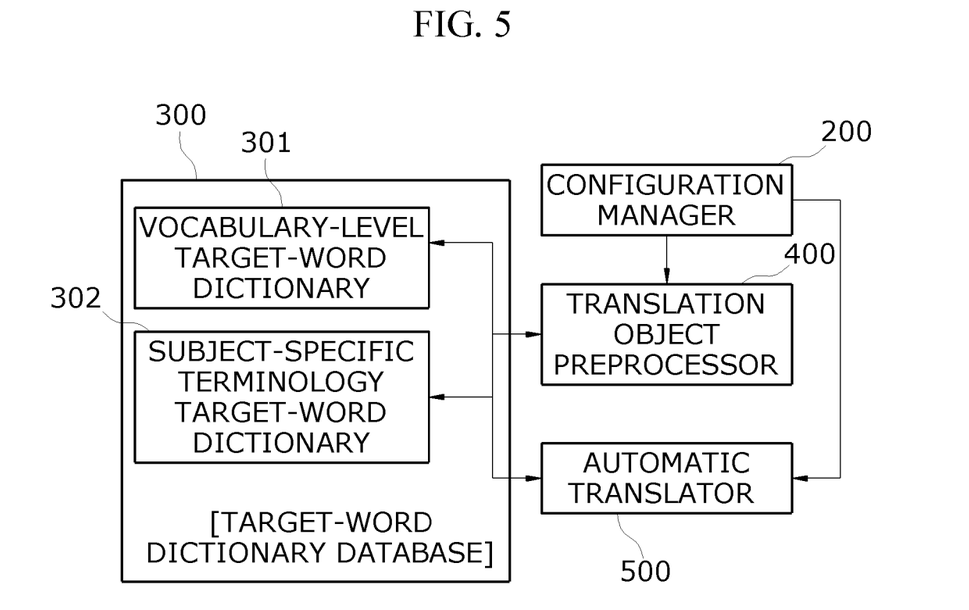
FIG. 5 is a view for describing a configuration of a target-word dictionary database in a user-customized interpretation and translation apparatus according to still another embodiment of the present invention.

FIG. 5 is a view for describing a configuration of a target-word dictionary database in a user-customized interpretation and translation apparatus according to still another embodiment of the present invention.

As shown in FIG. 5, according to still another embodiment of the present invention, the target-word dictionary database 300 may further include a subject-specific terminology target-word dictionary 302.

The subject-specific terminology target-word dictionary 302 may include independent vocabularies of subject setting information about a general subject, an economic subject, a trading subject, a legal subject, a computing subject, and the like.

Like this, when the subject setting information is involved in the user language level information of the user-settings information, the translation object preprocessor 400 and the automatic translator 500 are configured to reference the subject-specific terminology target-word dictionary 302, thereby performing the translation.

Below, user-customized Korean-Chinese interpretation and translation will be described according to another embodiment of the present invention.

In this embodiment, when the vocabulary-level target-word dictionary 301 is used in translation, only a target word matching with a user's vocabulary level is output even though there are many target words corresponding to one vocabulary word. For example, when translation object information (T05) is a vocabulary translation matching with a language level, "感謝 (thanks)" is provided as a target word of "감사" to a Korean beginner.

In this case, "監察 (inspection)" may be provided when the subject-specific terminology target-word dictionary 302 of the target-word dictionary database 300 is used in translation, and a legal terminology translation is requested.

In the legal subject, when the vocabulary translation matching with the user language level is requested, and a keyword of "감사" is involved in context information of "감사의 뜻으로 선물 전달 시", the keyword extractor 420 and the real-time interpretation object recognizer 440 transmit the context information to the automatic translator 500 so that "感謝 (thanks)" can be selected as the target word of "감사"

Meanwhile, Korean-Chinese translation based on the translation type information will be described according to another embodiment of the present invention.

First, when the original text receiver 100 receives an original such as " 증강현실은 현실세계에 가상물체를 겹쳐 보여주는 최신 기술로 최근 . . . ", a translation result of various translation types is provided on the basis of the translation type information of the user-settings information set by the configuration manager 200.

For example, when the translation type information is the foreign language voice recognition script information with the added sentence boundary, the user-customized original language information provider provides information such as " 증강현실은 현실세계에 가상물체를 겹쳐 보여주는 최신 기술로 최근 . . . " without translation in the translation object preprocessor 400 and the automatic translator 500.

On the other hand, when the translation type information is the foreign language key word information, the translation object preprocessor 400 references the target-word dictionary database and outputs a translation of " 증강현실 / 현실 세계 / 가상물체 ".

Meanwhile, when the translation type information is the key word and target word information, the translation object preprocessor 400 and the automatic translator 500 reference the target-word dictionary database and output a translation of " 증강현실 增強現實 / 현실세계 現实世界 / 가상물체 虛擬物體 . . . ."

Further, when the translation type information is the phrase unit real-time translation information to reduce a translation delay in the real-time interpretation and translation, the translation object preprocessor 400 and the automatic translator 500 reference the target-word dictionary database, and output a translation of "증강현실은 增强现实 // 현실세계에 가상물체를 겹쳐 보여주는 是在现实世界上 "叠放并显示虚拟物体 // 최신 기술은 的最新技术 // 최근 ≈ 最近 . . . ."

On the other hand, when the user language level information shows that a user has no idea of a corresponding foreign language or when a corresponding subject translation performance is good, the translation object preprocessor 400 and the automatic translator 500 reference the target-word dictionary database and output a translation of "增强现实是看起来在 现实世界上叠放虚拟物体的最新技术, 最近 . . . ."

Meanwhile, the original text receiver 100 according to one embodiment of the present invention may further include a document recognizer for recognizing a document including a text, and a text extractor for extracting a text from the document recognized by the document recognizer.

Further, the document recognizer and the text extractor may be replaced by the voice recognizer 110 and the text converter 120.

In addition, the original text receiver 100 may further include a media player for playing media including a voice. Since the original text receiver 100 includes the media player, media such as moving pictures and the like may also be subjected to user-customized translation.

Figure 6:
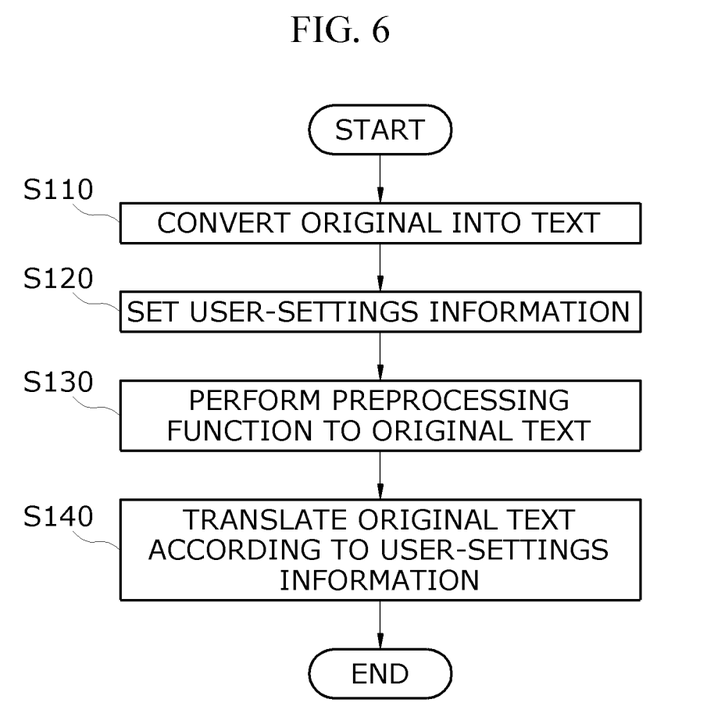
FIG. 6 is a flowchart for describing a user-customized interpretation and translation method according to one embodiment of the present invention; and FIG. 7A

FIG. 6 is a flowchart for describing a user-customized interpretation and translation method according to one embodiment of the present invention.

Below, the user-customized interpretation and translation method according to one embodiment of the present invention will be described with reference to FIG. 6.

First, the original text receiver 100 converts an input original into a text (S110).

Then, the configuration manager 200 receives the user-settings information and provides the received user-settings information to the translation object preprocessor 400 and the automatic translator 500 (S120).

Hereafter, when the translation object preprocessor 400 receives the original text from the original text receiver 100, the input original text is subjected to the preprocessing function according to the user-settings information provided by the configuration manager 200 (S130).

Then, the automatic translator 500 translates the preprocessed original text according to the user-settings information provided by the configuration manager 200 (S140).

Thus, according to one embodiment of the present invention, the translation of the original text is customized according to the user-settings information, i.e., the user language level in automatic interpretation and translation, thereby having an effect on enhancing comprehension of lecture/lesson/moving pictures/conversation content in the foreign language.

Meanwhile, the user-settings information may be the user language level information, i.e., a user's foreign language skill level information from a test of a translation language skill. Like this, when the user-settings information is the foreign language skill level information of the user, the automatic translator 500 may reference a vocabulary corresponding to the foreign language skill level of the user from the target-word dictionary database 300 and provide the user-customized translation service.

Further, the user-settings information may further include the translation type information corresponding to the user language level information.

Here, the translation type information may be one among the foreign language voice recognition original text subtitle information with the added sentence boundary, the foreign language key word translation information, the key word and the target word information, the phrase unit real-time translation information for reducing the translation delay at real-time interpretation and translation, and the sentence unit translation information for when a user has no idea of a corresponding foreign language or when a corresponding subject translation performance is high.

Here, the translation type information may be the translation type information set by a user according to the user-settings information provided by the configuration manager 200.

Meanwhile, the user-settings information may further include setting information about subjects such as a general subject, an economic subject, a trading subject, a legal subject, a computing subject, and the like.

To this end, the target-word dictionary database 300 further includes the subject-specific terminology target-word dictionary in which vocabularies of each subject, such as the general subject, the economic subject, the trading subject, the legal subject, the computing subject, and the like, are stored.

Figure 7A:
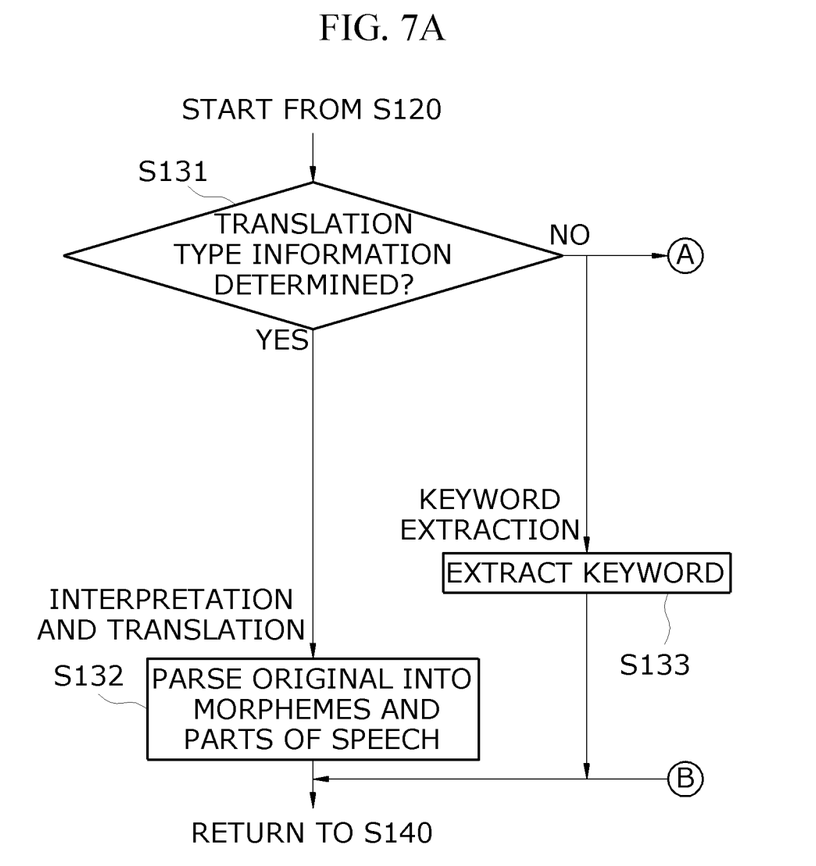
Figure 7B:
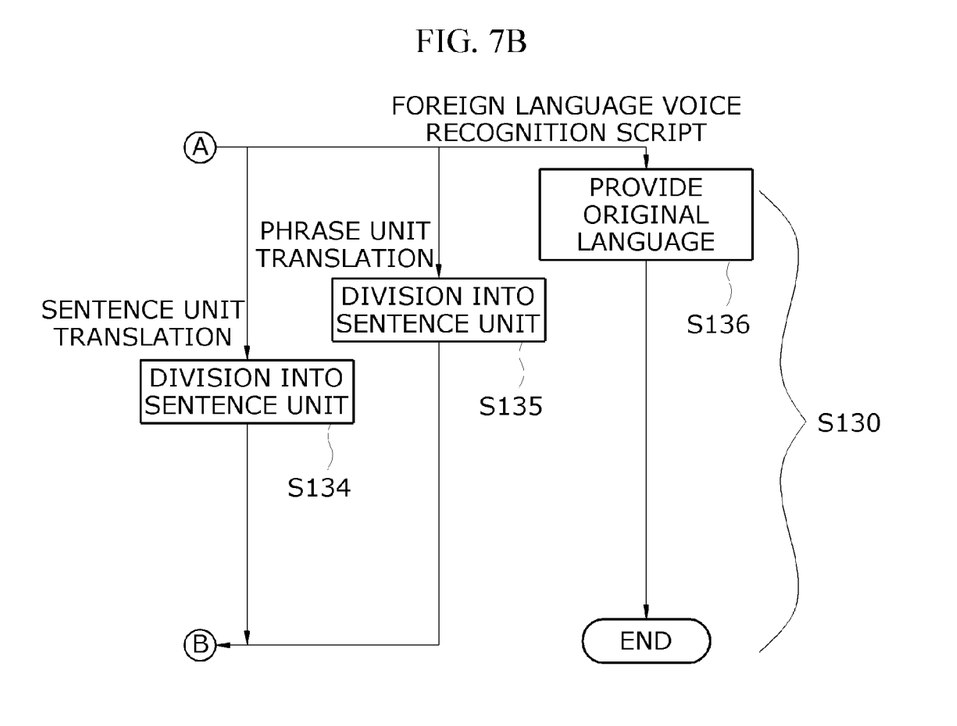
FIG. 7B is a flowchart for describing details of an operation of performing a preprocessing function on an original text in a user-customized interpretation and translation method according to one embodiment of the present invention.

FIG. 7A and FIG. 7B is a flowchart for describing details of an operation of performing a preprocessing function on an original text in a user-customized interpretation and translation method according to one embodiment of the present invention.

Below, the operation of preprocessing the original text in the user-customized interpretation and translation method according to one embodiment of the present invention will be described with reference to FIG. 7A and FIG. 7B.

As shown in FIG. 7A and FIG. 7B, the performance of the preprocessing function (S130) according to one embodiment of the present invention includes determining the translation type information in the user-settings information (S131).

In the determining (S131), when the translation type information shows a sentence unit translation type for a case where a user has no idea of a corresponding foreign language or a case where the corresponding subject translation performance is high, the morpheme parser 140 parses the original text into morphemes and parts of speech according to the user-settings information (S132).

In the determining (S131), when the translation type information shows a keyword extraction translation type, the keyword extractor 420 uses vocabulary appearance frequency, TF/IDF calculation of vocabulary appearance, and vocabulary level information to extract a relevant keyword in keyword or foreign language translation (S133).

In the determining (S131), when the translation type information shows a translation type for division into sentence units, the sentence boundary recognizer 430 divides an input text into sentence units (S134).

Then, the real-time interpretation object recognizer 440 divides an input text at certain positions of a continuous voice input when short sentence translation is set, so as to minimize the translation delay (S135).

In the determining (S131), when the translation type information in the user-settings information set by a user shows an original text subtitle type with the added sentence boundary, the original text receiver 100 provides the converted original text not to the translation object preprocessor 400 but to the user-customized original language information provider 600 (S136). In this case, the original text receiver 100 may provide the original text to the translation object preprocessor 400, but the translation of the original text may not be performed.

Figure 8:
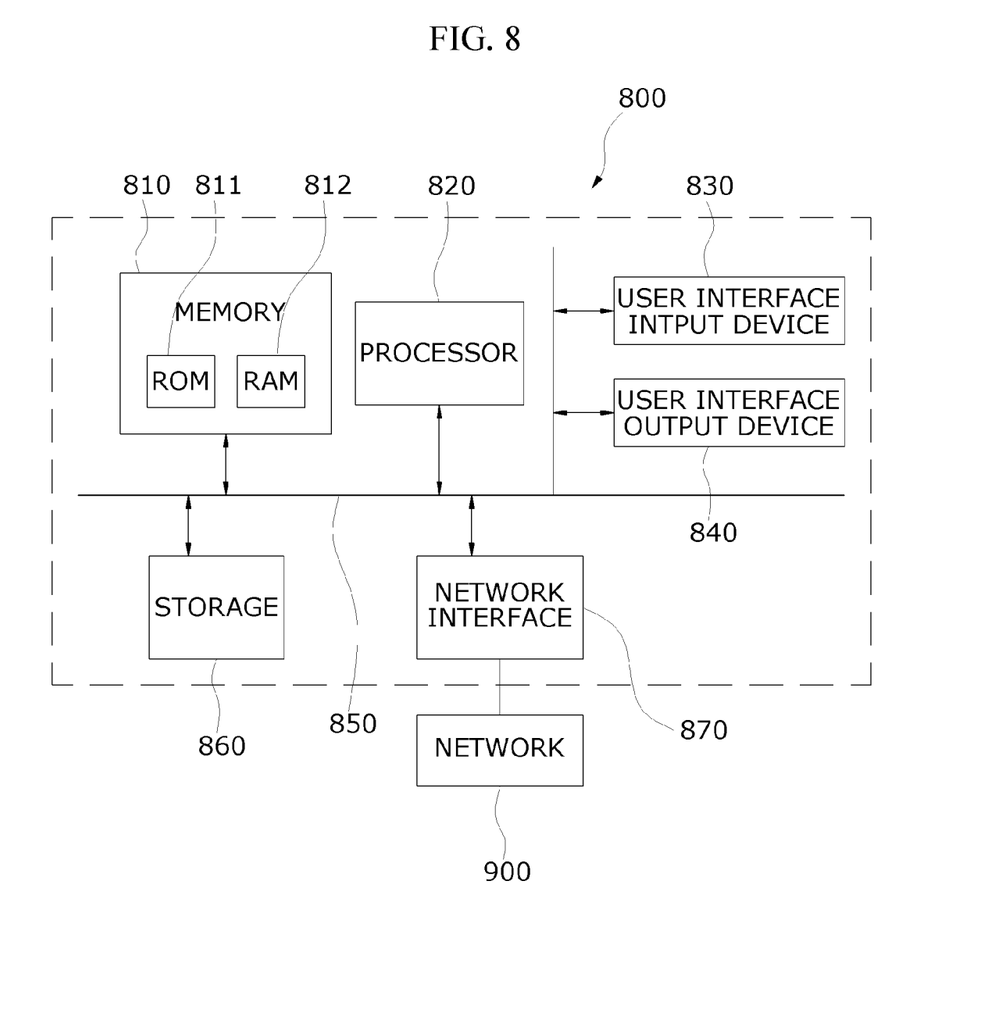
FIG. 8 is a block diagram illustrating a computer system to which the present invention is applied.

FIG. 8 is a block diagram illustrating a computer system to which the present invention is applied.

As shown in FIG. 8, a computer system 800 may include one or more of a memory 810, a processor 820, a user input device 830, a user output device 840, and a storage 860, each of which communicates through a bus 850. The computer system 800 may also include a network interface 870 that is coupled to a network 900. The processor 820 may be a central processing unit (CPU) or a semiconductor device that executes processing instruction stored in the memory 810 and/or the storage 860. The memory 810 and the storage 860 may include various forms of volatile or non-volatile storage media. For example, the memory 810 may include a read-only memory (ROM) 811 and a random access memory (RAM) 812.

As described above, the present invention provides an interpretation and translation service at various levels, such as specific-level vocabulary translation matching with a user language level, terminology translation, phrase unit translation, short sentence unit translation, full text interpretation and translation, etc., or provides a voice recognition result as it is without translation, thereby having an effect on enhancing a user's comprehension of lecture/lesson/moving pictures/conversation content in foreign language.

Further, the present invention contributes to a user's quick understanding of lecture/conversation content in a foreign language following a trend toward real-time simultaneous interpretation.

Although the few exemplary embodiments have been shown and described, it will be appreciated by those skilled in the art that various changes and modifications can be made in these exemplary embodiments without departing from the principles and spirit of the invention, the scope of which is defined in the appended claims and their equivalents.

REFERENCE NUMERALS

100: original text receiver
200: configuration manager
300: target-word dictionary database
400: translation object preprocessor
500: automatic translator

What is claimed is:

1. A user-customized interpretation and translation apparatus comprising:
   an original text receiver configured to receive an original text;
   a configuration manager configured to receive user-settings information comprises user language level information involving information about a foreign language skill level of a user and sentence translation information comprises translation type information which is based on the user language level information or set by a user;
   a translation object preprocessor configured to perform a preprocessing function for determining a translation type of the original text according to the user-settings information;
   an automatic translator configured to translate the preprocessed original text and make an output according to the determined translation type; and
   a user-customized original language information provider configure to output an input original text, wherein when the user-settings information for requesting the original text subtitle information is received by the configuration manager, the automatic translator outputs an input original text,
   wherein the translation object preprocessor outputs sentence translation types different according to the user language level information when the translation type information is set as the sentence translation information in the configuration manager, and
   wherein the translation type information comprises one among original text subtitle information, foreign language key word translation information, sub-sentence translation information.

2. The user-customized interpretation and translation apparatus according to claim 1, wherein, when the user-settings information for outputting the foreign language key word translation information is received, the automatic translator outputs the original text with the foreign language key word translation information.

3. The user-customized interpretation and translation apparatus according to claim 1, further comprising a target-word dictionary database in which a language vocabulary information corresponding to the foreign language skill level is stored,
   wherein, when the sentence translation information is received, the automatic translator translates the preprocessed original text by referring to the target-word dictionary database.

4. The user-customized interpretation and translation apparatus according to claim 1, wherein the user-settings information comprises setting information about subjects such as a general subject, an economic subject, a legal subject, a computing subject, and the like.

5. The user-customized interpretation and translation apparatus according to claim 3, wherein the translation object preprocessor comprises:
   a morpheme parser configured to parse the original text into morphemes and parts of speech according to the user-settings information;
   a keyword extractor configured to use vocabulary appearance frequency, term frequency (TF)/inverse document frequency (IDF) calculation of vocabulary appearance, and vocabulary level information to extract a relevant keyword at keyword or foreign language translation; and
   a sentence boundary recognizer configured to divide an input text into sentence units, and a real-time interpretation object recognizer configured to divide an input text at certain positions of a continuous voice input when short sentence translation is set, so as to minimize a translation delay.

6. The user-customized interpretation and translation apparatus according to claim 1, wherein the original text receiver comprises
   a voice recognizer configured to recognize a voice input in real time; and
   a text converter configured to convert the voice recognized by the voice recognizer into a text.

7. The user-customized interpretation and translation apparatus according to claim 1, wherein the original text receiver comprises:
   a document recognizer configured to recognize a document comprising a text; and
   a text extractor configured to extract the text from the document recognized by the document recognizer.

8. A user-customized interpretation and translation method comprising:
   receiving, through an original text receiver, an original text;
   receiving, through a configuration manager, user-settings information comprises user language level information involving information about a foreign language skill level of a user and sentence translation information comprises translation type information which is based on the user language level information or set by a user;
   performing, by a translation object preprocessor, a preprocessing function on the original text to determine a translation type of the original text according to the received user-settings information when the original text is received;
   translating, by an automatic translator, the preprocessed original text; and
   outputting, a user-customized original language information provider, an input original text, wherein when the user-settings information for requesting the original text subtitle information is received by the configuration manager, the automatic translator outputs the input original text,
   wherein the translation object preprocessor outputs sentence translation types different according to the user language level information when the translation type information is set as the sentence translation information in the configuration manager, and
   wherein the translation type information comprises one among original text subtitle information, foreign language key word translation information, sub-sentence translation information.

9. The user-customized interpretation and translation method according to claim 8, further comprising translating the preprocessed original text by referring to a target-word dictionary database.

10. The user-customized interpretation and translation method according to claim 8, wherein the user-settings information comprises setting information about subjects such as a general subject, an economic subject, a legal subject, a computing subject, and the like.

11. The user-customized interpretation and translation method according to claim 8, wherein the translation object preprocessor comprises:
   a morpheme parser configured to parse the original text into morphemes and parts of speech according to the user-settings information;
   a keyword extractor configured to use vocabulary appearance frequency, term frequency (TF)/inverse document frequency (IDF) calculation of vocabulary appearance, and vocabulary level information to extract a relevant keyword in keyword or foreign language translation; and
   a sentence boundary recognizer configured to divide an input text into sentence units, and a real-time interpretation object recognizer configured to divide an input text at certain positions of a continuous voice input when short sentence translation is set, so as to minimize a translation delay.

12. The user-customized interpretation and translation method according to claim 8, further comprising outputting an original text input by a user-customized original language information provider, when the user-settings information for requesting the original text subtitle information is received.

* * * * *